*B. D. Sutlief,*

*Extension Table.*

No. 86,113.  Patented Jan. 19, 1869.

Witnesses:
John H. Shugry
A. J. Tibbets

Inventor:
B. D. Sutlief
by John E. Earle
Attorney

B. D. SUTLIEF, OF WALLINGFORD, CONNECTICUT.

Letters Patent No. 86,113, dated January 19, 1869.

IMPROVED EXTENSION-TABLE.

The Schedule referred to in these Letters Patent and making part of the same.

*To all whom it may concern:*

Be it known that I, B. D. SUTLIEF, of Wallingford, in the county of New Haven, and State of Connecticut, have invented a new Improvement in Extension-Tables; and I do hereby declare the following, when taken in connection with the accompanying drawings, and the letters of reference marked thereon, to be a full, clear, and exact description of the same, and which said drawings constitute part of this specification, and represent, in—

Figure 1:
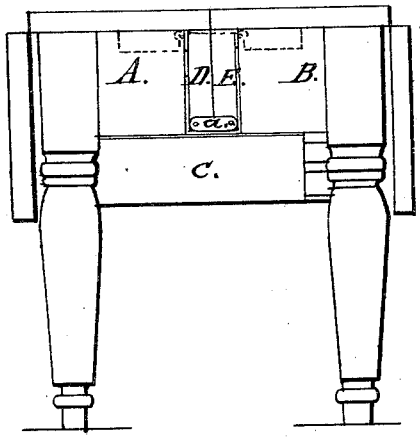
Figure 2:
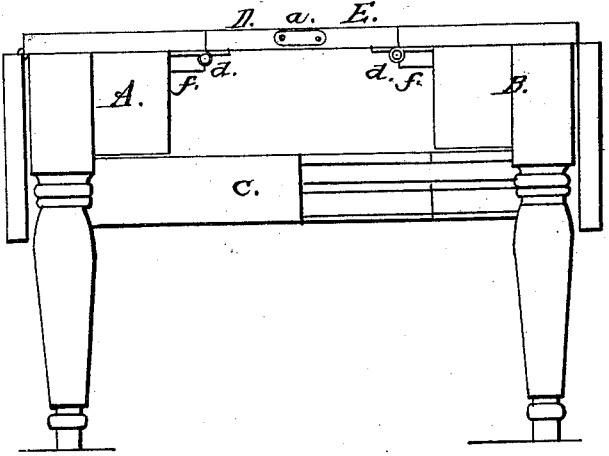
Figure 3:
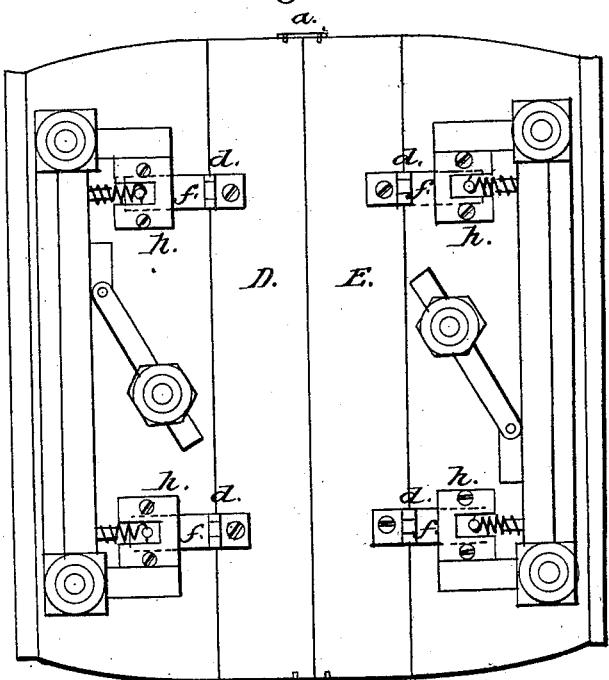

Figure 1, an end view of the table closed;
Figure 2, an end view extended; and in
Figure 3, the table inverted.

This invention relates to an improvement in the ordinary extension-table, the object being to so combine the leaves that they may be folded within the table itself, and thus avoid the necessity of removing them from the table, as in the common extension-table. To this end, The invention consists in hinging the centre leaves to the top of the table, by means of adjustable hinges, so that the centre leaves may fold beneath the top, and permit the closing together of the top.

To enable others to construct my improvement, I will fully describe the same as illustrated in the accompanying drawings.

A is one part, and B, the other part of an extension-table, constructed in the usual manner, with this exception, that the slides $c$, which permit the extension, are placed below the top sufficiently far to permit the folded centre leaves to stand edgewise between the slides and top, as seen in figs. 1 and 2.

I here represent but two centre leaves, D and E, hinged together at $a$, so as to double, as seen in fig. 1, and these leaves are hung at the top by hinges $d$, the hinges being fixed to their respective leaves, and to a bar, $f$, which slides in a guide, $h$, and each of the slides is provided with a spring, the tendency of which is to draw the slide back from the edge. Therefore, when in the position seen in fig. 2, turn the leaves down in the centre, forcing the two parts of the table together, and the leaves will turn on the hinges $d$, and, as the table closes, the slides will pass back under the table, as denoted in red, fig. 1, carrying the leaves under the top, so as to permit the perfect closing of the top; and when the table is required to be extended, separate the two parts, A and B, and the leaves D and E will be turned up into position, and can then be secured in any convenient manner.

If other leaves are required, they should be hinged to the leaves D and E at the centre and outside, the leaves being always hinged to the slides $f$.

By this arrangement the leaves may be increased in number, so far as practicable, in consideration of the structure of the table.

I do not wish to be understood as broadly claiming attaching extension-leaves to fixed leaves, so that the extension-leaves may be folded beneath the fixed leaves.

Having fully described my invention,

What I claim as new and useful, and desire to secure by Letters Patent, is—

In extension-tables, the arrangement of the leaves. D and E, adjustably hinged to the top, so as to fold substantially in the manner herein set forth.

B. D. SUTLIEF.,

Witnesses:
A. J. TIBBITS,
J. H. SHUMWAY.